US006950768B2

(12) United States Patent
Freund, Jr. et al.

(10) Patent No.: US 6,950,768 B2
(45) Date of Patent: Sep. 27, 2005

(54) SELF-TUNING ULTRASONIC METER

(75) Inventors: William R. Freund, Jr., Houston, TX (US); Klaus J. Zanker, Houston, TX (US); Gail P. Murray, Tomball, TX (US)

(73) Assignee: Daniel Industries, Inc., Houston, TX (US)

(*) Notice: Subject to any disclaimer, the term of this patent is extended or adjusted under 35 U.S.C. 154(b) by 0 days.

(21) Appl. No.: 10/657,689

(22) Filed: Sep. 8, 2003

(65) Prior Publication Data

US 2005/0055171 A1 Mar. 10, 2005

(51) Int. Cl.[7] ........ G01D 18/00
(52) U.S. Cl. ........ 702/89; 73/861.27
(58) Field of Search ........ 702/89; 73/861.27, 73/861.28, 861.29, 861.31

(56) References Cited

U.S. PATENT DOCUMENTS 5,983,730 A 11/1999 Freund, Jr. et al. ...... 73/861.28
6,226,598 B1 * 5/2001 De Vanssay et al. ......... 702/48
6,494,105 B1 12/2002 Gallagher ................ 73/861.27
6,634,240 B1 * 10/2003 Wallen .................... 73/861.28

OTHER PUBLICATIONS

U.S. Appl. No. 10/038,947, filed Jan. 3, 2002, Freund, Jr. et al.

* cited by examiner

*Primary Examiner*—John Barlow
*Assistant Examiner*—Stephen J. Cherry
(74) *Attorney, Agent, or Firm*—Conley Rose, P.C.

(57) ABSTRACT

A method and related ultrasonic meter identify and correct for transit time errors such as peak switch errors. The method includes calculating values for a set of diagnostics from measurements of the fluid flow, including transit time measurements. Based on the values for the diagnostics, and whether and how they fall outside of their respective ranges, the meter can identify a variety of problems with the meter or fluid flow, such as whether there has been an intermittent peak switch, a permanent peak switch, or the presence of noise, velocity pulsation in the fluid flow, temperature stratification, of other problem. In the event there is a problem with the meter, the meter self-tunes in order to minimize the chances of the problem happening again.

22 Claims, 2 Drawing Sheets

SELF-TUNING ULTRASONIC METER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

A disclosed embodiment of the invention relates generally to the detection of errors in ultrasonic transit time measurements. More particularly, a disclosed embodiment of the invention relates to the identification of mistakes in peak selection and other errors for the ultrasonic meter, with another aspect of the invention relating to a method for correction of ultrasonic meter measurement errors.

2. Description of the Related Art

After a hydrocarbon such as natural gas has been removed from the ground, the gas stream is commonly transported from place to place via pipelines. As is appreciated by those of skill in the art, it is desirable to know with accuracy the amount of gas in the gas stream. Particular accuracy for gas flow measurements is demanded when gas (and any accompanying liquid) is changing hands, or "custody." Even where custody transfer is not taking place, however, measurement accuracy is desirable.

Gas flow meters have been developed to determine how much gas is flowing through the pipeline. An orifice meter is one established meter to measure the amount of gas flow. More recently, another type of meter to measure gas flow was developed. This more recently developed meter is called an ultrasonic flow meter.

FIG. 1A shows one type of ultrasonic meter suitable for measuring gas flow. Spoolpiece 100, suitable for placement between sections of a gas pipeline, has a predetermined size and thus defines a measurement section. Alternately, a meter may be designed to attach to a pipeline section by, for example, hot tapping. As used herein, the term "pipeline" when used in reference to an ultrasonic meter may be referring also to the spoolpiece or other appropriate housing across which ultrasonic signals are being sent. A pair of transducers 120 and 130, and their respective housings 125 and 135, are located along the length of spoolpiece 100. A path 110, sometimes referred to as a "chord" exists between transducers 120 and 130 at an angle θ to a centerline 105. The position of transducers 120 and 130 may be defined by this angle, or may be defined by a first length L measured between transducers 120 and 130, a second length X corresponding to the axial distance between points 140 and 145, and a third length D corresponding to the pipe diameter. Distances D, X and L are precisely determined during meter fabrication. Points 140 and 145 define the locations where acoustic signals generated by transducers 120 and 130 enter and leave gas flowing through the spoolpiece 100 (i.e. the entrance to the spoolpiece bore). In most instances, meter transducers such as 120 and 130 are placed a certain distance from points 140 and 145, respectively. A fluid, typically natural gas, flows in a direction 150 with a velocity profile 152. Velocity vectors 153–158 indicate that the gas velocity through spool piece 100 increases as centerline 105 of spoolpiece 100 is approached.

Transducers 120 and 130 are ultrasonic transceivers, meaning that they both generate and receive ultrasonic signals. "Ultrasonic" in this context refers to frequencies above about 20 kilohertz as required by the application. Typically, these signals are generated and received by a piezoelectric element in each transducer. To generate an ultrasonic signal, the piezoelectric element is stimulated electrically, and it responds by vibrating. This vibration of the piezoelectric element generates an ultrasonic signal that travels across the spoolpiece to a corresponding transducer of the transducer pair. Similarly, upon being struck by an ultrasonic signal, the receiving piezoelectric element vibrates and generates an electrical signal that is amplified, digitized, and analyzed by electronics associated with the meter.

Initially, D ("downstream") transducer 120 generates an ultrasonic signal that is then received by U ("upstream") transducer 130. Some time later, U transducer 130 generates a return ultrasonic signal that is subsequently received by D transducer 120. Thus, U and D transducers 130 and 120 play "pitch and catch" with ultrasonic signals 115 along chordal path 110. During operation, this sequence may occur thousands of times per minute.

The transit time of the ultrasonic wave 115 between transducers U 130 and D 120 depends in part upon whether the ultrasonic signal 115 is traveling upstream or downstream with respect to the flowing gas. The transit time for an ultrasonic signal traveling downstream (i.e. in the same direction as the flow) is less than its transit time when traveling upstream (i.e. against the flow). In particular, the transit time $t_1$, of an ultrasonic signal traveling against the fluid flow and the transit time $t_2$ of an ultrasonic signal travelling with the fluid flow is generally accepted as being defined as:

$$t_1 = \frac{L}{c - V\frac{x}{L}} \tag{1}$$

$$t_2 = \frac{L}{c + V\frac{x}{L}} \tag{2}$$

where, c=speed of sound in the fluid flow;

V=average velocity of the fluid flow over the chordal path in the axial direction;

L=acoustic path length;

x=axial component of L within the meter bore;

$t_1$=transmit time of the ultrasonic signal against the fluid flow; and $t_2$=transit time of the ultrasonic signal with the fluid flow.

The upstream and downstream transit times are typically calculated separately as an average of a batch of measurements, such as 20. These upstream and downstream transit time averages may then be used to calculate the average velocity along the signal path by the equation:

$$V = \frac{L^2}{2x}\frac{t_1 - t_2}{t_1 t_2} \tag{3}$$

with the variables being defined as above.

The upstream and downstream travel times may also be used to calculate the speed of sound in the fluid flow according to the equation:

$$c = \frac{L}{2}\frac{t_1 + t_2}{t_1 t_2} \tag{4}$$

To a close approximation, equation (3) may be restated as:

$$V = \frac{c^2 \Delta t}{2x} \tag{5}$$

where, $$\Delta t = t_1 - t_2 \tag{6}$$

So to a close approximation at low velocities, the velocity v is directly proportional to Δt.

Given the cross-section measurements of the meter carrying the gas, the average velocity over the area of the meter bore may be used to find the volume of gas flowing through the meter or pipeline 100.

In addition, ultrasonic gas flow meters can have one or more paths. Single-path meters typically include a pair of transducers that projects ultrasonic waves over a single path across the axis (i.e. center) of spoolpiece 100. In addition to the advantages provided by single-path ultrasonic meters, ultrasonic meters having more than one path have other advantages. These advantages make multi-path ultrasonic meters desirable for custody transfer applications where accuracy and reliability are crucial.

Referring now to FIG. 1B, a multi-path ultrasonic meter is shown. Spoolpiece 100 includes four chordal paths A, B, C, and D at varying levels through the gas flow. Each chordal path A–D corresponds to two transceivers behaving alternately as a transmitter and receiver. Also shown is an electronics module 160, which acquires and processes the data from the four chordal paths A–D. This arrangement is described in U.S. Pat. No. 4,646,575, the teachings of which are hereby incorporated by reference. Hidden from view in FIG. 1B are the four pairs of transducers that correspond to chordal paths A–D.

The precise arrangement of the four pairs of transducers may be more easily understood by reference to FIG. 1C. Four pairs of transducer ports are mounted on spool piece 100. Each of these pairs of transducer ports corresponds to a single chordal path of FIG. 1B. A first pair of transducer ports 125 and 135 includes transducers 120 and 130 recessed slightly from the spool piece 100. The transducers are mounted at a non-perpendicular angle θ to centerline 105 of spool piece 100. Another pair of transducer ports 165 and 175 including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level" (i.e. a different radial position in the pipe or meter spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an X and the lower two pairs of transducers corresponding to chords C and D also form an X.

Referring now to FIG. 1B, the flow velocity of the gas may be determined at each chord A–D to obtain chordal flow velocities. To obtain an average flow velocity over the entire pipe, the chordal flow velocities are multiplied by a set of predetermined constants. Such constants are well known and were determined theoretically.

Thus, transit time ultrasonic flow meters measure the times it takes ultrasonic signals to travel in upstream and downstream directions between two transducers. This information, along with elements of the geometry of the meter, allows the calculation of both the average fluid velocity and the speed of sound of the fluid for that path. In multi-path meters the results of each path are combined to give an average velocity and an average speed of sound for the fluid in the meter. The average velocity is multiplied by the cross sectional area of the meter to calculate the actual volume flow rate.

Because the measurement of gas flow velocity and speed of sound depend on measured transit time, t, it is important to measure transit time accurately. More specifically, a characteristic of ultrasonic flowmeters is that the timing precision required is generally much smaller than a period of the ultrasonic signal. For example, gas ultrasonic meters have a timing precision on the order of 0.010 $\mu$s but the ultrasonic signal has a frequency of 100,000 to 200,000 Hz, which corresponds to a period of from 10.000 to 5.000 $\mu$s. Various methods exist for measuring transit times of ultrasonic signals.

One method and apparatus for measuring the time of flight of a signal is disclosed in U.S. Pat. No. 5,983,730, issued Nov. 16, 1999, entitled "Method and Apparatus for Measuring the Time of Flight of A Signal", which is hereby incorporated by reference for all purposes.

A difficulty that arises in measuring a time of flight exactly is defining when an ultrasonic waveform is received. For example, a waveform corresponding to a received ultrasonic signal may look like that shown in FIG. 2. The precise instant this waveform is deemed to have arrived is not altogether clear. One method to define the arrival instant is to define it as a particular zero crossing but to get a good transit time one needs to find a consistent, reliable zero crossing to use. One suitable zero crossing follows a predefined voltage threshold value for the waveform. However, signal degradation due to pressure fluctuations or the presence of noise may cause the correct zero crossing to be misidentified, as shown in FIG. 3 (not to scale). Other methods for identifying arrival time may also be used, but each is also subject to measurement error by misidentification of the proper arrival time. An approach to determine whether a peak selection error has occurred is disclosed in U.S. Ser. No. 10/038,947, filed Jan. 3, 2002 and entitled "Peak Switch Detector for Transit Time Ultrasonic Meters", which is hereby incorporated by reference for all purposes.

Although the problem of misidentification of an arrival time for an ultrasonic signal has long been known, previous approaches to identifying the instant of arrival for an ultrasonic signal are inadequate. There remains a need for a user-friendly ultrasonic meter and method that uses the diagnostic ability of the meter to check for malfunction in transit time measurements and automatically correct for it. Ideally, if the meter is working correctly, the meter would advise of any external anomalies (like bad flow profile, pulsation, etc.) in the rest of the metering system. Such a meter would provide improved performance over previous ultrasonic meters for measuring fluid flow, would maintain good performance, would advise if maintenance was necessary, and would alert a user to problems in the metering system or a need for recalibration. Also ideally, such a method or meter would be compatible with existing meters and would be inexpensive to implement.

SUMMARY OF THE INVENTION

One expression of the invention is a method to correct for errors in transit time measurements for ultrasonic signals. This method includes the steps of measuring times of flight for ultrasonic signals in a pipeline containing a fluid flow and calculating at least one diagnostic for the ultrasonic signals. At that time, the diagnostic(s) is compared to a set of one or more respective expected values to determine whether the values for the diagnostic is less than, equal to, or greater than the respective expected value. It can then be determined whether one or more errors exist in the times of flight, identifying the errors if they exist, and adjusting the set of expected values.

It is not necessary that each feature or aspect of the invention be used together or in the manner explained with respect to the disclosed embodiment. The various characteristics described above, as well as other features and aspects, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

The following describes a method and associated ultrasonic meter to identify errors in transit time measurements and, if errors are present, to tune the meter for optimum performance. The invention identifies and corrects for these time-of-flight measurement errors and distinguishes them from other problems that may be present in the fluid flow. The identity of these other problems may be brought to the attention of a user or operator.

An ultrasonic meter is working correctly if it is making a consistently accurate transit time measurement. It is therefore necessary to determine whether the meter is: 1) always making the correct transit time measurement; 2) normally making the correct transit time measurement; 3) sometimes making the correct transit time measurement; or 4) not making the correct transit time measurement at all.

The inventive ultrasonic meter differs from past ultrasonic meters by its unique analysis of various diagnostics, and by either self-tuning the affected operating parameter values to prevent errors from occurring again or by alerting a user of the problem. To ensure that the ultrasonic meter identifies and responds to errors accurately, the preferred embodiment includes adjustable parameters that are used by signal selection algorithms to select the correct zero crossing for measurement. Once it is determined that transit times are not being measured correctly, corrective action can be taken by tuning the signal selection parameters and alerting a meter operator of the problem(s).

Broadly speaking, an ultrasonic meter built according to the principles of the invention detects errors in transit time measurement and distinguishes them from other errors by recognizing significant variations or patterns of significant variations in the diagnostics from a default, theoretical or historical baseline. Measurements may vary in a number of different ways in the event there is a malfunction of the ultrasonic meter. Preferably, a combination of parameters or diagnostics is inspected. The greater the number of diagnostics considered, the greater the confidence a user may have in the result obtained by the meter. Many of the diagnostics used in the preferred embodiment to indicate the presence of meter malfunction are already broadly known. However, they are either not examined in the manner contemplated herein or not in the combinations disclosed. Consequently, the invention is applicable to previous ultrasonic meters by replacement or reprogram of their processor or processors that analyze the data.

Figure 4:
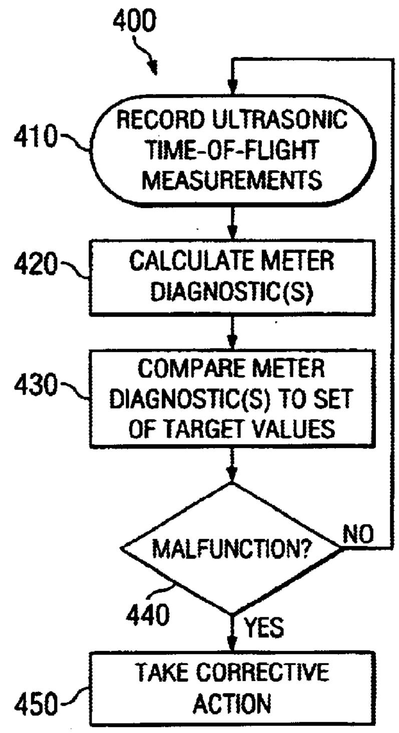
FIG. 4 is a flow chart of a method according to the invention.

Referring to FIG. 4, a method 400 according to a preferred embodiment of the invention is shown. At step 410, ultrasonic meter time-of-flight measurements are taken. At step 420, one or more meter diagnostics are calculated. At step 430, at least one measurement or meter diagnostic is compared to a first set of expected values. These expected values may be default values, theoretical values, values established on historical data, or, other suitable values. At step 440, the software run by the meter electronics determines whether a malfunction has been detected by the diagnostics being outside of the expected values. Also included at step 440 is identification of the malfunction. If a malfunction has been detected then at step 450, the ultrasonic meter takes corrective action or makes adjustments. This may include changing the values used to establish the time-of-flight measurement or alerting an operator to a particular problem with the fluid flow. If no malfunction has been detected, at step 460, the method returns to step 410 where further time of flight measurements are being taken.

The nominal or baseline values for each diagnostic, and the magnitude of the variation that constitutes "significant" variation, may depend upon such things as, e.g., the size of the meter, the design of the meter, the frequency of the ultrasonic signals, the sampling rate for the analog signals, the type of transducers being used, the fluid being transported, and the velocity of the fluid flow. Thus, it is not practical to provide nominal values for every relevant diagnostic under all conditions. The numerical examples provided herein are from ultrasonic meters of the general design described with reference to FIGS. 1A–1C. It is within the ability of one of ordinary skill in the art, however, to empirically record the normal or typical behavior of an ultrasonic meter and so establish nominal values for a diagnostic in question. This is established upon the ranges of values that are seen when a meter is operating properly, for example during calibration.

A particular variation may be "significant" (i.e. none-expected or non-normal) if its value is beyond what occurs 90% of the time, but this threshold could be adjusted up or down such as to 95% or 85% of the time to improve performance dependent upon conditions. This percentage may also be adjusted depending on the number of diagnostics being used. A greater number of diagnostics would typically lower the confidence needed in any one diagnostic to indicate a problem.

It is helpful to define selected diagnostic terms that are of particular interest.

| | |
|---|---|
| Eta | A diagnostic that equals zero if the signal arrival time is being measured correctly. A requirement is two ultrasonic paths of different lengths. Disclosed in U.S. Ser. No. 10/038,947, entitled "Peak Switch Detector for Transit Time Ultrasonic Meters", incorporated by reference. |
| Turbulence | A standard deviation of the delta t measurement times 100 and divided by a mean delta t. For a four-chord ultrasonic meter, turbulence is generally 2 to 3% for chords B and C and 4 to 6% for chords A and D, regardless of velocity and meter size except for very low velocities. |
| Signal Quality | The peak amplitude of the energy ratio. Large values imply good signal fidelity and low noise. High noise levels or signal distortion can lower signal quality (SQ) values. Disclosed in U.S. Pat. No. 5,983,730, incorporated by reference. |
| Pf | The point Pf, also referred to as the critical point in U.S. Pat. No. 5,983,730, represents a sample number corresponding to approximately ¼ of the peak amplitude of the energy ratio function. It is the estimate of the beginning of the ultrasonic signal. |
| $P_i$ | The sample number before the $i^{th}$ zero crossing following Pf. |
| Pe | The point Pe represents a sample number corresponding to approximately ¼ of the peak amplitude of the energy function. Disclosed in U.S. Pat. No. 5,983,730. |
| $SPF_i$ | Sample number difference between the $i^{th}$ zero crossing and the first motion detector. $SPF_i = P_i - Pf$ |
| % $Amp_i$ | Percentage amplitude of the $i^{th}$ signal peak compared to the maximum absolute signal peak. % $Amp_i = 100*A_i/Amax$ Where Ai is the amplitude of the peak or trough following the ith zero crossing and Amax is the maximum absolute signal amplitude. |
| $SPE_i$ | Sample number difference between the $i^{th}$ zero crossing and the first energy detector. $SPE_i = P_i - Pe$ |
| Target Values | Target values for SPF, % Amp, and SPE representing the desired zero crossing for measurement. Referred to as TSPF, TA, and TSPE. |
| SoS Signature | Comparison of each chord speed of sound to the average. This may be expressed a number of ways such as a ratio, percentage, difference, percentage difference, percentage difference to an expected value, etc. |
| Vel Signature | Comparison of each chord velocity to the average velocity. This may be expressed a number of ways such as a ratio, percentage, difference, percentage difference, percentage difference to an expected value, etc. |
| Delay Time Signature | The values of Eta when all delay times are set to zero. |
| Vel Ratios | Various ratios of the chord velocities. Swirl, cross-flow, and flow asymmetry are examples of ratios of the chord velocities. For the exemplary meter, suitable equations are: Swirl = $(V_B + V_C)/(V_A + V_D)$ Cross-flow = $(V_A + V_C)/(V_B + V_D)$ Asymmetry = $(V_A + V_B)/(V_C + V_D)$ Where $V_A$, $V_B$, $V_C$, and $V_D$ are the measured velocities along chords A, B, C, and D, respectively. |
| Delta t Ratio | Delta t on one chord divided by delta t on another chord from the same batch. |
| Max-Min Transit Times | The maximum minus minimum measured times for ultrasonic signals to travel across the meter spoolpiece in the same direction. Taken from a batch of transit times. |

Eta: Eta is the most accurate single indicator of whether an ultrasonic meter is measuring transit time correctly. As disclosed in U.S. Ser. No. 10/038,947, entitled "Peak Switch Detector for Transit Time Ultrasonic Meters", and incorporated herein by reference, Eta is a diagnostic that equals zero if the signal arrival time is being measured correctly on two chords of different lengths.

When arrival times of ultrasonic signals are being measured by zero crossings, errors in zero crossing are of a full wave magnitude. With a 125 kHz frequency waveform, the magnitude of the zero crossing error would be 8 microseconds. This type of error is referred to as a peak switch or cycle skip, and much of the digital signal processing (DSP) in conventional ultrasonic meters is aimed at avoiding such a peak switch, for example, the target values used to select the correct peak in the received signal. Parameters such as the target values can be used to help with diagnostics and self-tuning.

For a chord A of known length $L_A$, it is known that an ultrasonic wave traveling at the speed of sound "c" through a homogeneous medium at zero flow in the meter traverses the length of the chord $L_A$ in time $t_A$. $t_A$ may not be found, however, by simply averaging the upstream and downstream transit times when flow is present. Instead, the value of $t_A$ may be found algebraically by the equation:

$$t_A = \frac{L_A}{c} \tag{7}$$

it follows that:

$$c = \frac{L_A}{t_A} \tag{8}$$

This is just as true for a second chord B, such that:

$$c = \frac{L_B}{t_B} \tag{9}$$

For various reasons, however, the measured gross transit time is not exactly the actual transit time of the signal. One reason, for example, that the two times differ is the delay time inherent in the transducers and associated electronics.

If total measured time T is defined as:

$$T = t + \tau \tag{10}$$

where,

T=measured or gross transit time;

t=actual transit time; and

τ=delay time.

Then where the delay times and the speeds of sound are the same for chords A and B, it is known from equation (8) that:

$$c = \frac{L_A}{T_A - \tau} = \frac{L_B}{T_B - \tau} \tag{11}$$

Therefore:

$$L_A\,(T_B - \tau) = L_B\,(T_A - \tau) \tag{12}$$

and $$\tau = \frac{L_B T_A - L_A T_B}{L_B - L_A} \tag{13}$$

ΔL is defined as:

$$\Delta L = L_B - L_A \tag{14}$$

and it follows that:

$$\tau = \frac{L_B T_A}{\Delta L} - \frac{L_A T_B}{\Delta L} \quad (15)$$

with the variables being defined as above.

Of course the transducer delay time for chord A, $\tau_A$, and the transducer delay time for chord B, $\tau_B$, are not necessarily the same. However, these delay times are routinely measured for each pair of transducers at the manufacturing stage before the transducers are sent into the field. Since $\tau_A$ and $\tau_B$ are known, it is also well known and common practice to calibrate each meter to factor out transducer delay times for each ultrasonic signal. Effectively, $\tau_A$ and $\tau_B$ are then equal to zero and therefore the same. However, if there is a peak switch, this effectively changes the delay time of the transducer pair. Since the measured transit time T is defined as the actual transit time, t, plus delay time, $\tau$, actual transit time can be substituted for measured transit time T where there is no peak selection error to result in:

$$\frac{L_B t_A}{\Delta L} - \frac{L_A t_B}{\Delta L} = 0 \quad (16)$$

This equation can then be used as a diagnostic to establish whether an error exists in the peak selection. It is equation (16) that has general applicability to a broad range of ultrasonic meters and signal arrival time identification methods.

A variable $\eta$, may then be established:

$$\eta = \frac{L_B t_A}{\Delta L} - \frac{L_A t_B}{\Delta L} \quad (17)$$

where, $L_A$=length of chord A;

$L_B$=length of chord B;

$t_A$=average transit time of ultrasonic signals traveling along chord A;

$t_B$=average transit time of ultrasonic signals traveling along chord B; and $\Delta L = L_B - L_A$.

If there is a misidentified peak, $\eta \neq 0$. For example, given a 12 inch meter with LA=11.7865 inches, LB=17.8543 inches, signal period=8 microseconds, average velocity=about 65 ft/sec, and speed of sound=1312 ft/sec the values of Eta, measured in microseconds, would be as follows.

For the case where chord A has peak switches on its up and downstream transit time measurements but chord B does not, the possible combinations are.

| t1 A | t2 A | Eta |
|---|---|---|
| Late | Late | 23.6 |
| Late | 0 | 10.8 |
| 0 | Late | 12.6 |
| 0 | Early | −12.8 |
| Early | 0 | −10.9 |
| Early | Early | −23.6 |

Likewise where chord B experiences peak switches but chord A does not the results are.

| t1 B | t2 B | Eta |
|---|---|---|
| Late | Late | −15.6 |
| Late | 0 | −7.0 |
| 0 | Late | −8.5 |
| 0 | Early | 8.6 |
| Early | 0 | 7.1 |
| Early | Early | 15.6 |

As can be seen it is easy to identify which chord is at fault and in which direction the peak switch has occurred. Where peak switches have occurred on both chords one simply adds the appropriate values for each chord to obtain the Eta result. For example if both t1 and t2 are switched late on both chords A and B, Eta is equal to 23.6+(−15.6) which equals 8 microseconds. Eta can be calculated for all possible chord combinations. In the exemplary meter the combinations would be chords B and A, chords C and A, chords B and D, and chords C and D. These values can be compared to assist in identifying chords with peak switched signals.

In addition, $\eta$ can be expressed in terms of the measured speed of sound since we know that $t_A = L_A/c_A$ and $t_B = L_B/c_B$. It follows that:

$$\eta = \frac{L_B L_A (c_B - c_A)}{\Delta L c_A c_B} \quad (27)$$

where, $\eta$=error indicator Eta $L_A$, $L_B$=lengths of chords A and B;

$c_A$, $c_B$=values for speed of sound measured by chords A and B; and $\Delta L$=difference in the lengths of chords A and B.

It should be noted that the above equations are not limited to chords A and B, and any other chords may be used and chords A and B may even be inverted. The requirement is only that two ultrasonic paths of differing lengths are being used.

This calculation presents an additional advantage. Of course, ultimately this computation is based on the same variables as the earlier equations. But because a standard ultrasonic meter such as that sold by the assignee already calculates speed of sound for each chord, a value for $\eta$ may be easily computed based on already known or computed information.

The stability of Eta is dependent on the stability of the speed of sound measurements which have some variance due to flow turbulence. Eta will tend to jitter slightly at higher flow velocities. A jitter band is the scatter in the measurements from average. The jitter band for Eta is normally about 2 $\mu$s for data based on 1-second batches. This jitter can be reduced with filtering or averaging. Increased jitter is an increase in scatter in the measurements from average, resulting in higher standard deviations.

It should be noted that although the term "average" is used throughout the discussion of the preferred embodiment, the invention is not limited to any one type of averaging. Moving average, average of "c", low pass filter, etc. are all appropriate. Also, the exemplary meter uses batch data; however, the teachings of the invention apply equally well to filtered or averaged data.

A variation of Eta could be calculated in which no delay time corrections had been made to the transit times. In this case Eta would take on values near the actual delay times and should be equal to an Eta calculated using the delay times in place of the transit times in equation (16). This would be a delay time fingerprint for the meter. Then changes from these values would indicate problems. Eta could also be calculated using an average of the up and down stream transit times. The value of this Eta is near zero only at low flows; however, it does have a predictable characteristic with velocity and could be used as an effective diagnostic for peak switch detection.

Turbulence Parameter:

Turbulence parameter (TP) is a diagnostic that can be used independent of the self-tuning ultrasonic meter but that fits well in the context of a self-tuning ultrasonic meter.

As noted above, to a close approximation, the velocity v is directly proportional to $\Delta t$. The parameter $\Delta t$ may normally be based on the average of a batch of 20 (typically 10–30) measurements of $t_1$ (upstream) and $t_2$ (downstream). It is also possible to calculate the standard deviation on these 20 $\Delta t$ measurements $\sigma\Delta t$, and then to form a useful diagnostic parameter $TP=\sigma\Delta t/\Delta t*100\%$. Note that TP is a crude measure of turbulent fluctuations in the velocity v, and is dimensionless.

For meters from 4" to 36" bore with velocities from 5 to 160 ft/s, the diagnostic TP is mostly in the range 2 to 6%. So for fully developed turbulent flow we expect TP in the range 2–6%.

A high value for TP indicates that more investigation is required to establish whether a problem exists. More information is available from TP by looking at the individual value from each chord, instead of just the average value of all the chords. For example, if flow is not changing then for the inner chords (B&C) at 0.309R, TP≈2–3%, and for the outer chords (A&D) at 0.809R, TP≈4–6% for the exemplary meter. This difference is consistent with increased shear and turbulence as the chord approaches the pipe walls.

If the flow is changing during a batch measurement it will increase TP. For example, flow may increase from 15 to 30 ft/s in a few seconds. During this period transit time measurements are being made resulting in larger standard deviations than with steady flow. This could result in an average TP well above 6%. In addition, if the flow is unsteady, due to pulsation, flow separation, or vortex shedding, TP will increase. If it is a bulk flow effect TP will increase on all chords, while if it is a local effect, fewer than all chords will increase.

Signal Quality:

The Signal Quality (SQ) diagnostic depends on the idea of an "energy ratio" as explained in U.S. Pat. No. 5,983,730. As explained in the '730 patent, an energy ratio may advantageously be used to determine the beginning of the ultrasonic signal and thus discriminates between where the received signal is present, and where it is not. Signal Quality is the maximum value of the energy ratio curve.

Large peak amplitude values for the energy ratio imply good signal fidelity and low noise. For example, for the exemplary meter a value of SQ above 100 using a 1.125 inch diameter transducer at the recited frequency and sampling rate imply good signal fidelity and low noise. High noise levels or signal distortion can lower SQ values. Transducers of different design may have different SQ values for normal operation. For example, a ¾ inch diameter transducer produces SQ values >400 in normal operation as compared with the above 1.125 inch transducer.

Peak Selection Diagnostic:

In the preferred embodiment, the energy ratio curve is used to select a "zero crossing" that defines the exact instant an ultrasonic waveform arrives. According to the preferred embodiment, values of three selection parameters arc calculated for a predetermined number of zero crossings (intersections of waveform 510 at zero amplitude) following $P_f$. The zero crossing with the highest composite score is identified as the time of arrival.

The three selection parameters are:

$SPF_i=P_i-Pf$ (measured as number of samples);

$SPE_i=P_i-Pe$ (measured as number of samples); and $\%\ Amp_i=100*Ai/Amax$

Where $P_i$ is the sample number before the $i^{th}$ zero crossing $A_i$ is the value of the peak or trough following the $i^{th}$ zero crossing Amax is the maximum absolute amplitude of the signal.

These three peak selection parameters are found and compared with target values, which are set to default values on initialization. Once signals have been acquired, the target values for each chord and direction are allowed to track to the measured values thus strengthening the selection of the identified zero crossing. The target values of SPF, % Amp, and SPE are referred to as TSPF, TA, and TSPE and are the values of SPF, % Amp, and SPE representing the desired zero crossing for measurement. The term "target values" refers specifically to these three tracked parameters.

The composite score for each zero crossing is the value of a selection function referred to as Fsel, determined according to the following equations:

$$FPF_i = 1 - \left|\frac{SPF_i - TSPF}{Sen_f}\right| \tag{28}$$

$$FPE_i = 1 - \left|\frac{SPE_i - TSPE}{Sen_E}\right| \tag{29}$$

$$FA_i = 1 - \left|\frac{\%Amp_i - TA}{Sen_A}\right| \tag{30}$$

$$Fsel_i=100(w_f(FPF_i)+w_E(FPE_i)+w_A(FA_i)) \tag{31}$$

Where i is the counter for zero crossings following Pf (typically 1 through 4). The values $W_f$, $W_E$, and $W_A$ are weighting factors having default values of 2, 1, and 2 respectively. In terms of confidence, the three peak selection parameters fall in order from SPF to % Amp to SPE.

The sensitivity variables in the denominator of each equation are 10, 18, and 30 for $Sen_f$, $Sen_E$, and $Sen_A$ respectively. These are used to adjust the selection functions so that one does not dominate the others. The values given are appropriate for the exemplary meter but could be changed to sharpen the selection process or for other systems with different signal characteristics.

Figure 5:
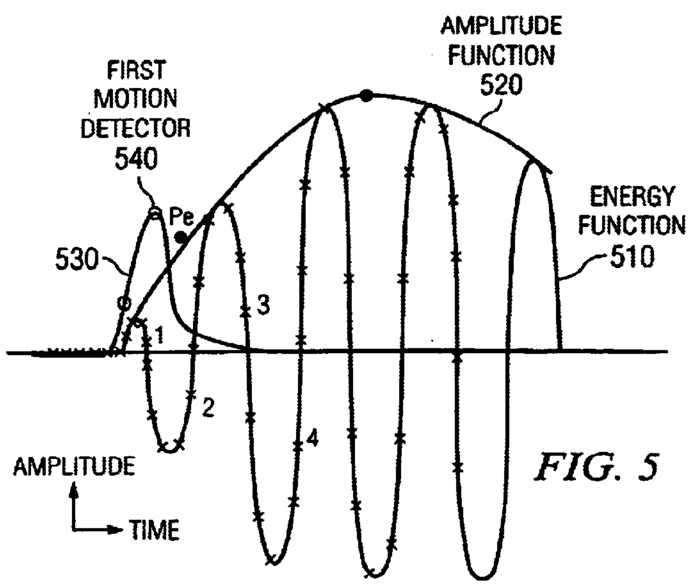
FIG. 5 is an example of an idealized ultrasonic signal with various identified criteria.

As stated above, the sampling point with the highest composite score is identified as the sampling point prior to the zero crossing of interest to identify the time of arrival. Linear interpolation is used with the sampling point following the one with the high composite score in order to determine the time of arrival for the signal. Preferably, although more or fewer zero crossings may be used, selection parameters are calculated for the first 4 zero crossings after $P_f$. The locations of four such zero crossings are shown in FIG. 5 by the numbers 1, 2, 3, and 4. Four zero crossings are thought to be long enough to include the desired zero crossing in this embodiment (i.e. zero crossing with highest composite score).

Thereafter, both the target values and the weightings may be adjusted individually and dynamically to improve the reliability of the measurement. Depending on the meter design, the adjustments may vary.

Given a frequency of ultrasonic signals of 125 kHz and a sampling rate of 1.25 MHz, the default value for SPF is 15, for % Amp is −80, and for SPE is 8. The significance of these values, however, is simply that they represent typical values of the parameters at a zero crossing of interest. They would change if other parameters change including which zero crossing is measured.

SoS Signature:

Comparison of each chord speed of sound to the average. This variable confirms a peak switch error and should be redundant if Eta is used. The SoS Signature is also an indicator of the presence of a temperature gradient in the meter.

Vel Signature:

Comparison of each chord velocity to the average velocity. This value changes at low velocities because of convection. The velocity signature diagnostic is reliable enough to confirm other diagnostic indications and therefore increases operator confidence in them.

Delta t Ratio:

Delta t on one chord divided by delta t on another chord from the same batch or group. If a cycle skip occurs for only one upstream or downstream transit time measurement, then Δt changes for that chord by one period. There exists a 2-to-1 transit time ratio from the inner to the outer chords in the exemplary four-chord meter, and a 1-to-1 ratio for chords of the same length and placement. Chords in meters of different design with different length and placement could have different ratios.

Max-Min Transit Times:

Maximum transit time minus minimum transit time. These times indicate the presence of a peak switch. If a peak switch exists, a sudden change of one period occurs in the measured maximum and/or minimum transit times. Other phenomena that affect transit time measurements, such as pulsation in the fluid flow, don't create a sudden jump in transit time measurements.

Noise:

Noise is preferably measured as part of the received ultrasonic signal. It is then analyzed to determine frequency and amplitude. It is sometimes desireable to receive a signal when there is no pulse emission. Then everything received can be considered noise.

The following examples show how diagnostic values may change when the meter changes from a steady-state operating condition to having a permanent peak switch error, an intermittent peak switch, pulsation in the fluid flow, noise in the fluid flow, and temperature stratification.

Steady State (Meter Operating Properly)

If the ultrasonic meter is operating properly, and so no peak switching is present, the following would be expected:

1. All Etas=0±jitter band (size of jitter band dependent on amount of averaging). At 1 second updates jitter ~2 us at high velocity.
2. Turbulence=2 to 6%.
3. Standard Deviations of transit times are normal for velocity and meter size.
4. SQ values are high, reflecting good signal quality. For example, SQ may be 100+for the exemplary meter, dependent on transducers.
5. Target Values are nominal if noise is low and SQ is high. SPF is normal (15±3), and % Amp is normal (75%±25%).
6. SoS Signature is nominal and has not deviated from historical trend. For the exemplary meter, this may be within about 0.1% of the average reading.
7. Velocity Signature is nominal and has not deviated from historical trend. For the exemplary meter, chords A and D may be 0.89±0.05, and chords B and C may be 1.042±0.02.
8. Velocity Ratios are nominal and have not deviated from historical trend. For the exemplary meter, swirl may be 1.17±0.05, cross-flow may be 1±0.02, and asymmetry may be 1±0.02.
9. Delta t Ratio is nominal. For the exemplary four-chord ultrasonic meter, delta t is about 2 between inner and outer paths. The ratio would be 1:1 for paths of the same lengths and similar location in the spoolpiece.
10. Max minus Min transit times are within normal boundaries. For the exemplary meter at 125 KHz, this is <1 signal period for a permanent peak switch. At higher velocities or frequencies, it may be greater than one signal period but nonetheless normal as defined by a historical baseline.
11. Noise levels should be nominal.

Since these conditions indicate errorless operation, no adjustments or corrections are required.

Permanent Cycle Skin

If a transient event causes an upset and the signal transit time measurement is incorrect, there may be a permanent cycle skip (peak switch). In such a case, and if all other conditions are nominal (i.e. low noise and no pulsations, etc. resulting in no significant variation in the diagnostic measurements), then the following would be expected:

1. Etas≠0 (meaning outside jitter band) and deviations of Etas are tight (±2 $\mu$s) for a peak switched path. A permanent peak switch on a chord leads to non-zero values of Eta for each measurement using that chord. The chord at fault and the direction of the cycle skip can be identified by examining the pattern and values of the Eta functions.
2. Turbulence=2 to 6%
3. Standard Deviations of transit times are normal for velocity and meter size.
4. Signal Quality (SQ) is high.
5. Target Values are not normal for affected paths if noise is low and SQ is high. A low SPF implies an early peak while a high SPF implies a late peak. The presence of either of these is especially telling if the low/high SPF is equivalent to one signal period. In the exemplary meter, SPF=10 for one signal period, or 8 microseconds at 125 kHz.
6. SoS Signature has deviated significantly from historical trend. This is more obvious in smaller meters because the time of flight is shorter and 1 period represents a greater percentage change.
7. Velocity Signature has deviated significantly from historical trend. More obvious in smaller meters and also more obvious at lower velocities. Much more obvious if only the up or down stream signal on a chord has peak switched.
8. Velocity ratio may have changed.
9. Delta t Ratio may have changed significantly. If both up and downstream signals on a path have switched in the same direction then there is no significant change in the Delta t Ratio. If only the up or down stream signal has peak switched then there is a significant change in the Delta t Ratio. This change is more pronounced for smaller meters and lower velocities.

10. Max–Min transit times are within normal boundaries. For the exemplary meter at 125 KHz, this is <1 signal period for a permanent (as contrasted to intermittent) peak switch. At higher velocities or frequencies, it may be greater than one signal period but nonetheless normal as defined by a historical baseline.

11. Noise levels should be normal.

A number of adjustments or corrections in response to the permanent cycle skip may be attempted. As a first correction attempt, when the tracked target values are not within 25% of their default values, then they should be reset to their default values. If the tracked signal detection parameters are not within 25% of their default values then it is possible that a transient disturbance in the flow has caused an upset in the signal detection algorithm resulting in a permanent peak switch. Because the default values are determined from empirical data of normal operation, resetting the target values to their default values will likely also reset the meter to normal operation. This involves resetting the target values to their default values and then continuing normal measurement allowing target values to track.

One could also simply reset the tracked values for the chord identified as incorrect.

A second correction attempt may be executed if the first correction attempt is unsuccessful. The failure of the first correction attempt suggests that either the default values are set wrong or the signals are so distorted that a meaningful measurement can not be made. In response, target values on affected paths should be adjusted to correct the problem:

1. Adjust SPF to the value of the preceding or following zero crossing. This may continue to be repeated.
2. Adjust % Amp to the value of the preceding or following peak.
3. Adjust the weights for the signal selection function. If % Amp values are close then the weight assigned to % Amp should be reduced. The weight for SPF could also be increased.

If, for the exemplary meter, the average of measured values for a particular diagnostic is within about 25% of its default value then nothing should be done after the meter is operating properly. Otherwise, the system should set a warning for the user that the default values are incorrect. The default values may also be reset, either alone or in combination, with a warning to the user.

Intermittent Cycle Skip

High levels of noise or signal distortion caused by high flow rates, or highly turbulent flow can cause the signal measurement to be incorrect by way of an intermittent cycle skip. In such a case, the following could be expected:

1. Deviations of Etas are increased. Because Eta is calculated with average speeds of sound, Eta may still be near zero.
2. Turbulence levels are increased on fewer than all the chordal paths. In particular, turbulence levels are increased on affected paths only.
3. Standard deviations of transit times are high for velocity and meter size on affected paths only. If there is no pulsation, then the transit times and SPFs should fall into two distinct groups (histogram)—either peak switched or not. In contrast, velocity pulsation affects transit variably and so spreads the transit time measurements.
4. SQ may be low if the source of intermittent cycle skip is signal distortion (especially due to high flow rates).
5. Target values may exhibit increased jitter.
6. SoS Signature may exhibit increased jitter.
7. Velocity Signature may exhibit increased jitter.
8. Velocity ratios may exhibit increased jitter.
9. Delta t Ratio may exhibit increased jitter.
10. Max–Min transit times are outside normal boundaries. For the exemplary meter at 125 KHz, this is >1 signal period.
11. Noise levels may be raised if the source of intermittent cycle skip is external noise or flow noise.

Adjustments or corrections in response to the intermittent cycle switch may be attempted. In particular, weights for peak selection functions should be modified to prevent further intermittent cycle skip.

1. Compare overall scores of the peak selection function for values which are not significantly different. For example, values within 10% of each other are close enough to facilitate misidentification of the correct zero crossing.
2. Evaluate individual scores of the peak selection functions for values which are not significantly different or indicate the wrong peak.
3. Reduce weight of corresponding function by one.
4. If SPF function gives strong correct indication increase weight by one.
   Allowed weights (with relative reliability of these three diagnostics)
   TSPF—2 (default) or 3 (adjusted) (most reliable)
   TSPE—1 (default) or 0 (adjusted) (least reliable)
   TA—2 (default) or 1 (adjusted) (middle reliability)
5. If problem persists narrow range for allowed target values.

Pulsation in Fluid Flow

The presence of velocity pulsations in the fluid flow is not a problem with the meter per se. However, in the context of an ultrasonic meter, a user often finds additional information about the fluid flow helpful. In addition, it is undesirable to fire the transducers of the ultrasonic meter at a multiple of the velocity pulsation frequency because of the possibility of introducing a bias in the time measurement. Thus, identification of, and compensation for, velocity pulsations is a useful aspect of an ultrasonic meter.

The challenge to the meter is to distinguish pulsation from intermittent peak switching. If the meter is measuring correctly (but pulsation is present), the following would be expected:

1. Etas should be near zero with normal to slightly elevated jitter.
2. Turbulence levels are increased for all chords. Turbulence is also dependent on velocity pulsation and this is reflected in the turbulence measurement.
3. Standard Deviations of transit times are high for velocity and meter size for all chords as the effects of velocity pulsation are added to those of turbulence.
4. SQ should be normal if pulsation does not distort the signal.
5. Target values have low jitter, especially SPF. If the pulsation is causing signal distortion then one might see higher jitter on SPE and % Amp.
6. SoS Signature is normal.

7. Velocity Signature exhibits increased jitter.
8. Velocity ratios may vary significantly.
9. Delta t Ratio should exhibit increased jitter.
10. Max–Min transit times can take most any value. A batch of Max–Min transit times do not fall into discrete groups but will be smeared across a range of values.
11. Noise levels should be normal.

To identify the presence of velocity pulsation and its frequency, the following routine may be executed by, for example, the processor associated with the ultrasonic meter that operates on the data:

1. Look at a series of transit time measurements along one chord in one direction to establish a max value, a Min value, frequency, etc.
2. Confirm with a second chord.
3. Stack the signal waveforms. Stacking tends to corrupt the signal waveform in the presence of pulsation. In contrast, with asynchronous noise and no pulsation, the signal is made more distinct. Stacking is the average of corresponding samples of multiple signals on the same path and in the same direction. For example if 4 signals were stacked for chord A in the upstream direction, then one would average the values at sample number 1 for the 4 signals to obtain a stacked sample number 1. This process continues for sample 2, 3, etc. until all values have been averaged.
4. If pulsation is detected, the firing rate should be modulated to avoid locking into the pulsation frequency.
5. Report pulsation frequency and amplitude.

Noise in the Fluid Flow

Noise degrades the ultrasonic signal, and thus identification of it and subsequent compensation for it is desirable.

Noise falls into two categories: synchronous or asynchronous. Synchronous noise is produced by the meter. It comes from either a transducer still ringing from a previous firing when it receives a signal, sing around from the firing transducer through the meter body to the receiving transducer, or crosstalk in the electronics.

Asynchronous noise is generally produced external to the meter. It comes from the interaction of flow with the pipe work and other installed equipment such as valves. Lower frequencies are stronger. The flow noise tends to excite resonances in the transducer producing noise signals that tend to be at these transducer resonant frequencies and at levels which can compete with or totally swamp the ultrasonic signals. Asynchronous noise may also be generated in the electronic circuits such as internal oscillators, etc. This noise tends to be at frequencies above that of the flow generated noise and, at least for many ultrasonic meters, the ultrasonic signals. Their amplitudes are generally lower. A spectrum of the signal reveals specific frequencies above that of the ultrasonic signals.

Stacking is the sample-by-sample average of the raw signals. It may be employed to distinguish between synchronous and asynchronous noise. If noise is reduced when the received ultrasonic signals are stacked, it suggests the noise is asynchronous. If the noise is not reduced from stacking the signals, it suggests the noise is synchronous.

To identify the presence of noise, and to distinguish between the two types of noise, the following routine can be executed:

1. Measure the noise levels in front of the signal.
2. Examine the signal for increased frequency peaks when compared to a base spectrum. New or increased frequency peaks suggest a source of noise. For example, if a transducer had a resonance at 60 KHz, it would show in the base spectrum of the ultrasonic signal. If this resonance peak is seen to increase, the presence of flow noise is indicated.
3. If the noise is reduced when the signals are stacked, it implies the presence of asynchronous noise. Stacking can help minimize asynchronous noise. If not, the implication is that the noise is synchronous.
4. Take a signal measurement when no pulse is fired. Any noise present should be asynchronous.
5. If high frequency noise is present, it suggests electrical noise. If not, it suggests that noise present in the signal is noise from the fluid flow.
6. Turning on the band pass filter can help reduce out of band synchronous and asynchronous noise.
7. Modulating or changing the firing rate or sequence may help with synchronous noise from transducer ring down. The noise would still be present but the batch of transit time measurements should average out to a more correct value. Adding stacking with the modulated firing rate should reduce synchronous noise from transducer ring down.
8. By process of elimination, synchronous noise that is present after executing the above routine must be from sing around or cross talk.

Temperature Stratification

Temperature stratification becomes observable at low flow rates. Essentially, the gas in the pipe is no longer at one temperature. The most serious consequence of this is that the temperature measurement for AGA8 calculations may be incorrect. As is known, AGA8 is the industry standard for conversion of gas at different pressures and temperatures to an accepted standard (base) temperature and pressure.

At low velocities, crosscurrents form by, e.g., a temperature differential between the outside and inside of the pipeline. The velocity signature tends to diverge. If the ambient temperature is high compared to the gas temperature then the flow profile will be pushed down and the velocities of the lower paths will increase and those of the upper paths will decrease. The opposite is true if the ambient temperature is low compared to the gas temperature. The greater the temperature difference the more pronounced the divergence. This divergence has been noticed at flow velocities as high as about 6 m/s in a twelve inch meter. It becomes more pronounced as the flow velocity decreases and the meter size increases.

Another significant problem in the presence of temperature stratification is that the calculated Eta's tend to diverge. The Eta function was derived assuming a constant and uniform speed of sound on the two paths for which Eta is calculated. Temperature stratification changes the speed of sound at each path such that the measurements diverge with the upper chord having the highest value in gas conditions where the speed of sound increases with increasing temperature. This will change the Eta value. Eta values would tend to follow the following pattern.

| | |
|---|---|
| Eta BA | Zero to slightly negative |
| Eta CA | Negative |
| Eta BD | Positive |
| Eta CD | Slightly positive |

It would also be expected that other measures such as target values, turbulence, standard deviations, etc. are nominal.

There are a number of adjustments or procedures that are appropriate for a temperature stratification condition. The ultrasonic meter should alert the user that the temperature in the meter is not constant. The ultrasonic meter electronics may also calculate a weighted average speed of sound and use it to estimate a weighted average temperature. The weighted average speed of sound can be calculated using the same weighting factors ($W_i$) as used for the velocity.

$$\overline{C} = \sum_{1}^{4} C_i W_i = 0.1382 C_A + 0.3618 C_B + 0.3618 C_C + 0.1382 C_D$$

The weighted average speed of sound is then converted to a temperature based on knowledge of previous changes of the speed of sound with temperature, or from typical values for the gas composition. For example natural gas changes about 0.7° F. per ft/s change in speed of sound at typical pipeline conditions. If the location of the temperature measurement is known it can be corrected to the weighted average temperature to be more representative of the stratified flow. Note that a 1° F. error in temperature typically produces about a 0.2% error in volume correction

General

One advantage to the invention is its broad applicability to existing meter designs. The invention applies to a broad variety of ultrasonic meters. For example, suitable ultrasonic meters include single or multi-chord meters, or those with bounce paths or any other path arrangement. The invention applies to meters that sample and digitize an incoming ultrasonic signal but could also apply to those that operate on an analog signal. It also applies to a broad assortment of methods to determine an arrival time for an ultrasonic signal.

The invention is highly adaptable to current and future meter designs. An ultrasonic meter includes its spoolpiece and at least one transducer pair, but also includes electronics or firmware built to process the measured data. For example, although thousands of pieces of data may be measured corresponding to the sampled ultrasonic signals, the ultrasonic meter may output only flow velocity and speed of sound for each chord. Changes to previous meters to incorporate the invention apply to the meter electronics and programming, simplifying implementation of the ideas contained in the instant patent.

Figure 1A:
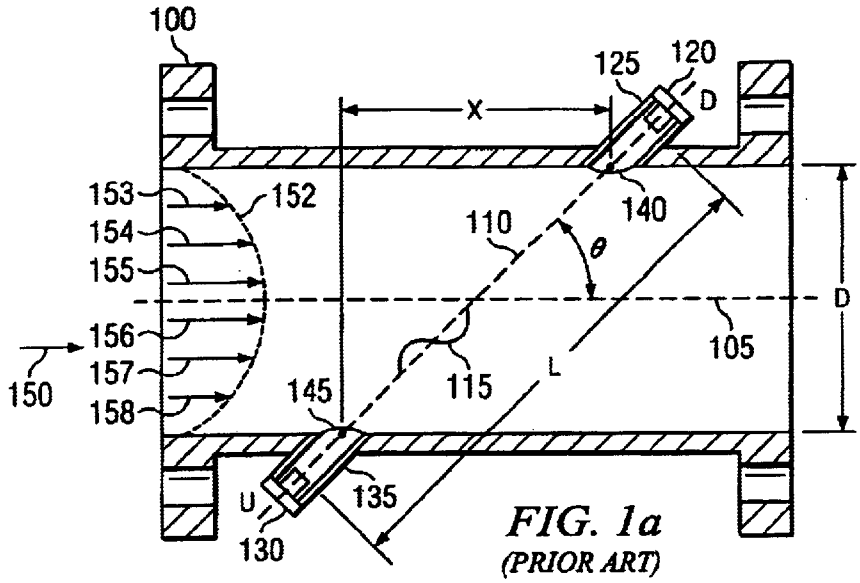
FIG. 1A is a cut-away top view of an ultrasonic gas flow meter.
Figure 1B:
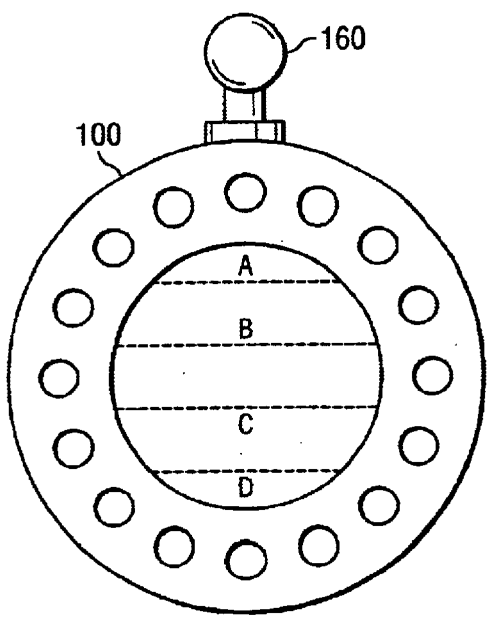
FIG. 1B is an end view of a spoolpiece including chordal paths A–D.
Figure 1C:
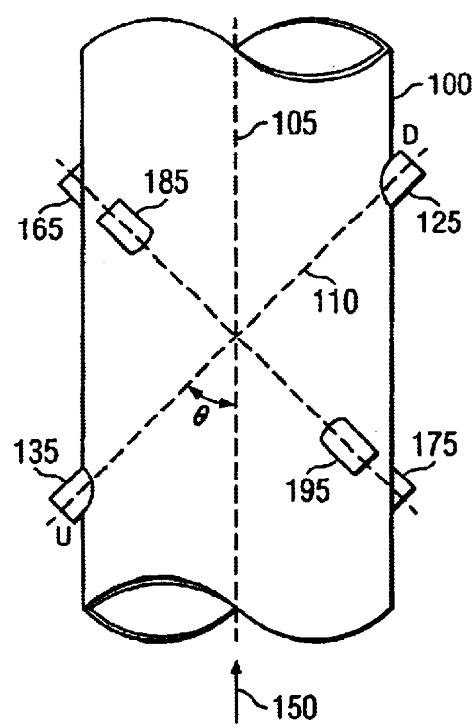
FIG. 1C is a top view of a spoolpiece housing transducer pairs.
Figure 2:
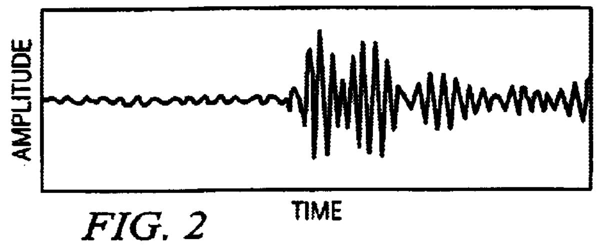
FIG. 2 is a first exemplary received ultrasonic waveform.
Figure 3:
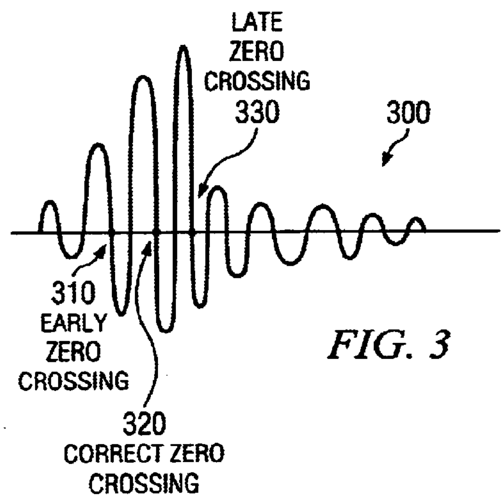
FIG. 3 is a second exemplary received ultrasonic waveform.

Although the numerical examples provided were based on a four-chord ultrasonic meter of the assignee generally in accordance with the design taught in FIGS. 1A–1C, it is within the skill of the ordinary artisan to collect data for any ultrasonic meter of interest to establish "normal" ranges for measurements of interest.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, the principles of the invention may be implemented by integer arithmetic instead of floating point in order to speed the calculations. In addition, the meter can be used to identify a variety of problems and is not limited only to those disclosed herein. Accordingly, the scope of protection is not limited to the embodiments described herein, but is only limited by the claims that follow, the scope of which shall include all equivalents of the subject matter of the claims.

What is claimed is:

1. A method to correct for errors in transit time measurements for ultrasonic signals, comprising:

a) measuring times of flight for ultrasonic signals in a pipeline containing a fluid flow;

b) calculating at least one diagnostic for said ultrasonic signals;

c) comparing said at least one diagnostic to a set of respective expected values to determine whether values for said at least one diagnostic is less than, equal to, or greater than the respective expected values;

d) determining whether one or more errors exist in said measurements for said times of flight dependent upon said comparing step;

e) correcting for said one or more errors if said one or more errors includes misidentification of ultrasonic signal arrival time in at least one measurement for said ultrasonic signals.

2. The method of claim 1, wherein said step of measuring times of flight for said ultrasonic signals includes calculation of a time of arrival for each of said ultrasonic signals based on a first set of variables and said step of correcting for said one or more errors includes adjusting said first set of variables.

3. The method of claim 1, wherein said step of measuring times of flight for said ultrasonic signals includes calculation of a time of arrival for each of said ultrasonic signals based on a set of target values and said step of correcting for said one or more errors includes adjusting said set of target values to default values.

4. The method of claim 3, wherein said target values are SPF, SPE, and % Amp.

5. The method of claim 1, further comprising:

f) activating an alert signal based upon said comparing step.

6. The method of claim 1, wherein said at least one diagnostic includes a calculation of Eta.

7. The method of claim 1, wherein said at least one diagnostic includes a calculation of turbulence.

8. The method of claim 1, wherein said at least one diagnostic includes a calculation of signal quality.

9. The method of claim 1, wherein said at least one diagnostic includes a calculation of at least one peak selection diagnostic.

10. The method of claim 1, wherein said at least one diagnostic includes a calculation of a speed of sound signature.

11. The method of claim 1, wherein said at least one diagnostic includes a calculation of a velocity signature.

12. The method of claim 1, wherein said at least one diagnostic includes a calculation of at least one velocity ratio between chords in said ultrasonic meter.

13. The method of claim 1, wherein said at least one diagnostic includes a calculation of a ratio for measured differences in times between said ultrasonic signals.

14. The method of claim 1, wherein said step of identifying said one or more errors includes identifying a permanent cycle switch.

15. The method of claim 1, wherein said step of identifying said one or more errors includes identifying an intermittent cycle switch.

16. The method of claim 1, further comprising identifying noise in the fluid flow.

17. The method of claim 1, further comprising identifying velocity pulsation in fluid flow through said ultrasonic meter.

18. The method of claim 1, further comprising identifying temperature stratification in fluid flow through said ultrasonic meter.

19. The method of claim 1, wherein said at least one diagnostic includes a calculation of at least one maximum-transit-time-minus-minimum-transit-time diagnostic.

20. A self-tuning ultrasonic meter, comprising:

a spoolpiece through which travels a flow of fluid;

a first transducer to generate first ultrasonic signals generally against said flow of fluid and to receive second ultrasonic signals generally with said flow of fluid;

a second transducer to generate said second ultrasonic signals and to receive said first ultrasonic signals;

electronics to calculate arrival times for said first ultrasonic signals and said second ultrasonic signals and to determine the presence of errors in said calculations of arrival times by comparing a set of diagnostics to a set of values to establish the presence of deviation by said set of diagnostics from said set of values, said electronics correcting for said errors if they exist.

21. The self-tuning ultrasonic meter of claim 20, said set of values being predetermined.

22. The self-tuning ultrasonic meter of claim 20, said set of values being dynamic and based on historical data accumulated by said self-tuning ultrasonic meter.

* * * * *